US012657865B2

(12) United States Patent
Merchant et al.

(10) Patent No.: US 12,657,865 B2
(45) Date of Patent: Jun. 16, 2026

(54) EVALUATION OF CONTRAST BETWEEN TEXTUAL PORTIONS AND BACKGROUND PORTIONS OF AN IMAGE

(71) Applicant: Dell Products L.P., Round Rock, TX (US)

(72) Inventors: Karim Merchant, Torrance, CA (US); Stacey Lynn Lumley, Corpus Christi, TX (US)

(73) Assignee: Dell Products L.P., Round Rock, TX (US)

( * ) Notice: Subject to any disclaimer, the term of this patent is extended or adjusted under 35 U.S.C. 154(b) by 318 days.

(21) Appl. No.: 18/495,851

(22) Filed: Oct. 27, 2023

(65) Prior Publication Data

US 2025/0139936 A1 May 1, 2025

(51) Int. Cl.
| | |
|---|---|
| *G06T 5/70* | (2024.01) |
| *G06T 3/40* | (2006.01) |
| *G06V 10/56* | (2022.01) |
| *G06V 10/60* | (2022.01) |
| *G06V 30/10* | (2022.01) |

(52) U.S. Cl.
CPC ................ *G06V 10/56* (2022.01); *G06T 3/40* (2013.01); *G06T 5/70* (2024.01); *G06V 10/60* (2022.01); *G06V 30/10* (2022.01); *G06T 2207/10024* (2013.01)

(58) Field of Classification Search
CPC ........ G06V 10/56; G06V 10/60; G06V 30/10; G06V 10/82; G06T 3/40; G06T 5/70; G06T 2207/10024

USPC ......................................................... 382/162
See application file for complete search history.

(56) References Cited

U.S. PATENT DOCUMENTS

| | | | | |
|---|---|---|---|---|
| 10,319,116 B1 * | 6/2019 | C | ............................ | G09G 5/377 |
| 10,970,884 B1 * | 4/2021 | Yang | ..................... | G06T 11/001 |
| 11,386,590 B1 * | 7/2022 | Bonfiglio | .............. | G06T 11/001 |
| 2007/0201757 A1 * | 8/2007 | Madej | ................... | G06Q 20/208 |
| | | | | 382/254 |
| 2007/0252846 A1 * | 11/2007 | Ozawa | ..................... | G09G 5/24 |
| | | | | 345/589 |

(Continued)

OTHER PUBLICATIONS

"WebAim, Contrast Checker"; https://webaim.org/resources/contrastchecker/; downloaded on Oct. 23, 2023.

(Continued)

*Primary Examiner* — Ali Bayat
(74) *Attorney, Agent, or Firm* — Ryan, Mason & Lewis, LLP

(57) ABSTRACT

Techniques are provided for evaluation of contrast between textual portions and background portions of an image. One method comprises identifying a textual portion in an image; automatically determining a contrast ratio threshold applicable to the textual portion based on one or more font characteristics (e.g., a font size, a font weight and/or a font type) of the textual portion; determining a contrast ratio of the textual portion based on a luminance of a background portion of the image that is adjacent to the textual portion; comparing the contrast ratio and the contrast ratio threshold; and initiating one or more automated actions based on a result of the comparison. Machine learning may be employed to predict one or more of the font characteristics of the textual portion.

20 Claims, 10 Drawing Sheets

(56) References Cited

U.S. PATENT DOCUMENTS

| | | | |
|---|---|---|---|
| 2011/0074807 A1* | 3/2011 | Inada .................... | G06T 11/001 |
| | | | 345/589 |
| 2017/0195605 A1* | 7/2017 | Alves ................. | H04N 23/6811 |
| 2022/0335662 A1* | 10/2022 | Echevarria Vallespi ..................... | |
| | | | G06T 11/001 |

OTHER PUBLICATIONS

"Supercharge Accessibility"; www.getstark.co; downloaded on Oct. 23, 2023.
U.S. Appl. No. 17/723,724, filed Apr. 19, 2022, entitled "Emotional Resonance Scoring of a Visual Stimulus".

\* cited by examiner

EXPAND YOUR UNIVERSE

BRING YOUR THOUGHTS
INTO THE WORLD

200

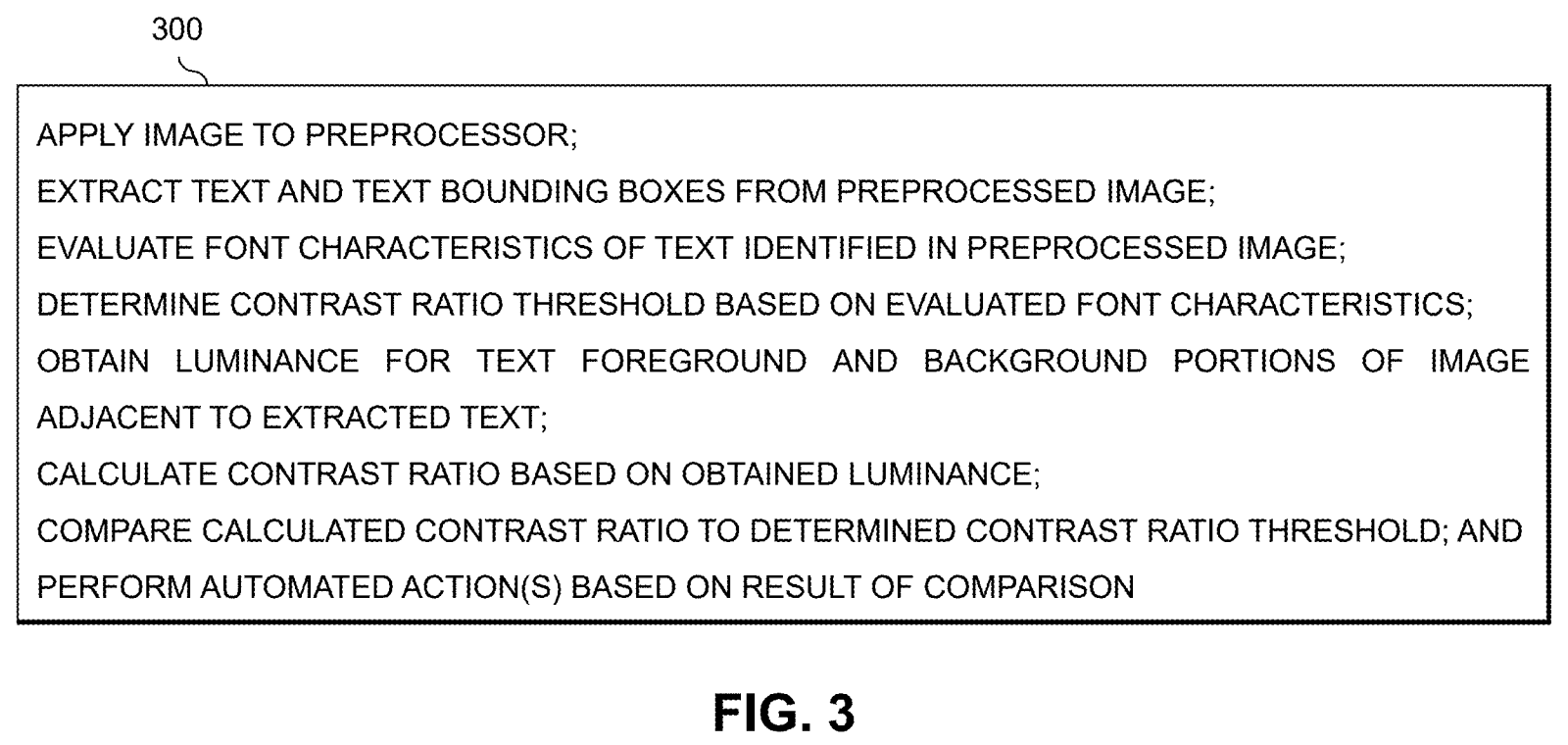

300

APPLY IMAGE TO PREPROCESSOR;

EXTRACT TEXT AND TEXT BOUNDING BOXES FROM PREPROCESSED IMAGE;

EVALUATE FONT CHARACTERISTICS OF TEXT IDENTIFIED IN PREPROCESSED IMAGE;

DETERMINE CONTRAST RATIO THRESHOLD BASED ON EVALUATED FONT CHARACTERISTICS;

OBTAIN LUMINANCE FOR TEXT FOREGROUND AND BACKGROUND PORTIONS OF IMAGE ADJACENT TO EXTRACTED TEXT;

CALCULATE CONTRAST RATIO BASED ON OBTAINED LUMINANCE;

COMPARE CALCULATED CONTRAST RATIO TO DETERMINED CONTRAST RATIO THRESHOLD; AND

PERFORM AUTOMATED ACTION(S) BASED ON RESULT OF COMPARISON

FIG. 3

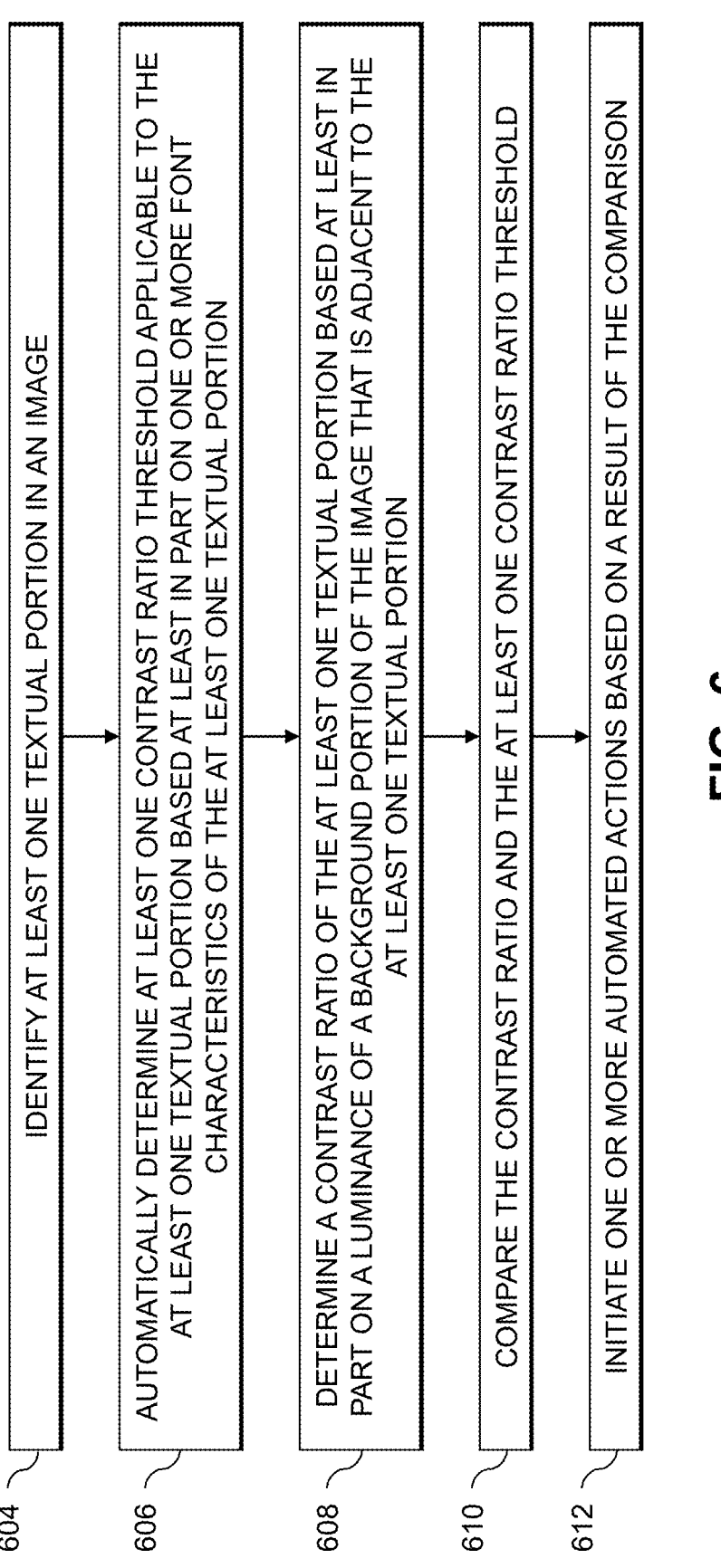

FIG. 6

604 — IDENTIFY AT LEAST ONE TEXTUAL PORTION IN AN IMAGE

606 — AUTOMATICALLY DETERMINE AT LEAST ONE CONTRAST RATIO THRESHOLD APPLICABLE TO THE AT LEAST ONE TEXTUAL PORTION BASED AT LEAST IN PART ON ONE OR MORE FONT CHARACTERISTICS OF THE AT LEAST ONE TEXTUAL PORTION

608 — DETERMINE A CONTRAST RATIO OF THE AT LEAST ONE TEXTUAL PORTION BASED AT LEAST IN PART ON A LUMINANCE OF A BACKGROUND PORTION OF THE IMAGE THAT IS ADJACENT TO THE AT LEAST ONE TEXTUAL PORTION

610 — COMPARE THE CONTRAST RATIO AND THE AT LEAST ONE CONTRAST RATIO THRESHOLD

612 — INITIATE ONE OR MORE AUTOMATED ACTIONS BASED ON A RESULT OF THE COMPARISON

EVALUATION OF CONTRAST BETWEEN TEXTUAL PORTIONS AND BACKGROUND PORTIONS OF AN IMAGE

BACKGROUND

The accessibility of digital technology aims to ensure that such digital technology may be used by people with disabilities. The W3C (World Wide Web Consortium) Web Accessibility Initiative (WAI), for example, provides standards and materials for implementing accessibility efforts. One common accessibility concern is a failure to ensure a sufficient contrast between text in an image and the background of the image. Contrast refers to an amount of color differentiation that exists between various features of an image, such as text.

SUMMARY

Illustrative embodiments of the disclosure provide techniques for evaluation of contrast between textual portions and background portions of an image and for performing at least one automated action based on a result of the evaluation. An exemplary method comprises identifying at least one textual portion in an image; automatically determining at least one contrast ratio threshold applicable to the at least one textual portion based at least in part on one or more font characteristics of the at least one textual portion; determining a contrast ratio of the at least one textual portion based at least in part on a luminance of a background portion of the image that is adjacent to the at least one textual portion; comparing the contrast ratio and the at least one contrast ratio threshold; and initiating one or more automated actions based at least in part on a result of the comparison.

Illustrative embodiments can provide significant advantages relative to conventional techniques for evaluating contrast ratios. For example, problems associated with existing contrast ratio evaluation techniques are overcome in one or more embodiments by automatically determining a contrast ratio threshold and a contrast ratio applicable to a textual portion of an image and performing at least one automated action based on the determined contrast ratio.

These and other illustrative embodiments include, without limitation, methods, apparatus, networks, systems and processor-readable storage media.

BRIEF DESCRIPTION OF THE DRAWINGS

FIG. 3 is a process diagram illustrating an exemplary implementation of a process for evaluation of contrast between textual portions and background portions of an image in an illustrative embodiment;

FIG. 6 is a flow diagram illustrating an exemplary implementation of a process for evaluation of contrast between textual portions and background portions of an image, according to an embodiment.

DETAILED DESCRIPTION

Figure 1:
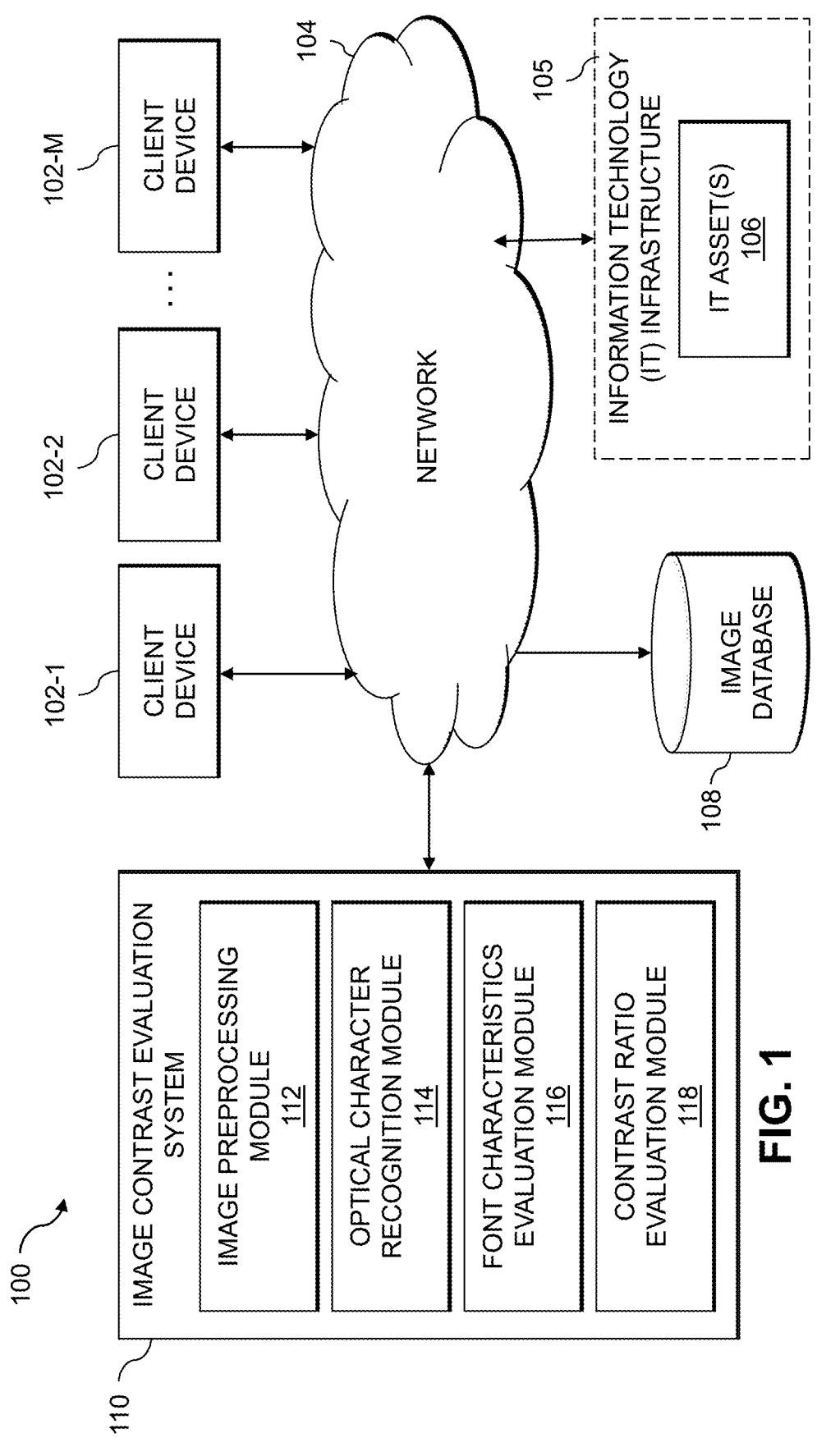
FIG. 1 is a block diagram of an information processing system configured for evaluation of contrast between textual portions and background portions of an image in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

As noted above, accessibility aims to ensure that digital technology may be used by people with disabilities. One aspect of accessibility may require colors to have sufficient contrast, for example, between a text color and a background color (sometimes referred to as luminance contrast ratio or contrast ratio), with respect to text on images, icons and/or buttons. Color is often used to convey information on diagrams, maps, and other types of images and such colors need to be distinguishable. A contrast ratio may be expressed as a ratio of a luminance of a foreground portion (e.g., text) of an image to the luminance of a background portion of the image.

Web Content Accessibility Guidelines (WCAG) have been developed that provide recommendations for various aspects of web content accessibility. For example, section 1.4.3 of WCAG version 2.1 specifies that a visual presentation of text and images of text should have a contrast ratio of at least 4.5:1, with some exceptions (e.g., large-scale text, where images of large-scale text should have a contrast ratio of at least 3:1). Thus, various thresholds for contrast ratios may be applicable to different forms of text in an image. For example, WCAG version 2.1 specifies that text below 24 pixels vertically for regular text or below 18.5 pixels vertically for bold text has a higher contrast requirement (e.g., a 4.5:1 contrast ratio) than text above such thresholds (e.g., a 3:1 contrast ratio).

One or more aspects of the disclosure recognize that not all text is generated the same way, which can affect an evaluation of the contrast associated with such text. For example, text can be generated using browser page code and realized in the browser (sometimes referred to as "real text"), or text can be embedded in an image, forming part of that image (sometimes referred to as "embedded text"). In addition, the evaluation of text contrast against more complex backgrounds presents additional challenges. For example, text may be overlayed in an image over a photograph where both light and dark portions overlap underneath the text. Existing contrast evaluation techniques do not visualize the contrast of failing parts of a background, and manual samples must be taken from various parts of the background that are adjacent to the text, to be checked individually. Further, as noted above, text contrast requirements may vary according to the text size that it is presented to the user. Since images containing embedded text can be displayed at much larger or smaller sizes than the original size of such images, it may be difficult to ascertain the actual text size with existing techniques.

In one or more embodiments, the disclosed techniques for evaluation of contrast between textual portions and background portions of an image help to make images more accessible to people with disabilities. In some embodiments, optical character recognition (OCR), image processing and/or machine learning techniques are employed to identify text present in an image (or portion of an image) and to determine the corresponding font size and contrast ratio, regardless of whether such text is "real" text or "embedded" text. The disclosed contrast ratio evaluation techniques may repeat the contrast evaluation sequentially for images having text appearing against multiple differently colored background portions. One or more automated actions may be performed based on the contrast evaluation. For example, the automated actions may comprise generating one or more notifications in response to a failing contrast ratio, an image may be presented indicating failing portions of the image that have a failing contrast ratio, one or more recommendations may be provided to improve the contrast ratio and/or one or more mitigation actions may be performed to automatically adjust the contrast ratio to ensure a satisfactory contrast ratio. The recommendations and/or mitigation actions may comprise moving a failing text portion to a different portion of an image and/or employing a different color that would provide a satisfactory contrast ratio. In this manner, the disclosed contrast ratio evaluation techniques automatically detect contrast ratio issues in images and automatically adjust one or more characteristics of such images to mitigate a detected contrast ratio issue.

FIG. 1 shows an information processing system 100 configured in accordance with an illustrative embodiment. The information processing system 100 is assumed to be built on at least one processing platform and provides functionality for evaluation of contrast between textual portions and background portions of an image. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106, an image database 108, and an image contrast evaluation system 110. The IT assets 106 may comprise physical and/or virtual computing resources in the IT infrastructure 105. Physical computing resources may include physical hardware such as servers, host devices, storage systems, networking equipment, Internet of Things (IoT) devices, other types of processing and computing devices including desktops, laptops, tablets, smartphones, etc. Virtual computing resources may include virtual machines (VMs), containers, etc.

The IT assets 106 of the IT infrastructure 105 may host software applications that are utilized by respective ones of the client devices 102, such as in accordance with a client-server computer program architecture. In some embodiments, the software applications comprise web applications designed for delivery from assets in the IT infrastructure 105 to users (e.g., of client devices 102) over the network 104. Various other examples are possible, such as where one or more software applications are used internal to the IT infrastructure 105 and not exposed to the client devices 102.

In some embodiments, the image contrast evaluation system 110 is used for an enterprise system. For example, an enterprise may subscribe to or otherwise utilize the image contrast evaluation system 110 to evaluate the contrast between textual portions and background portions of an image, for example, as part of accessibility efforts of the enterprise system. As used herein, the term "enterprise system" is intended to be construed broadly to encompass any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

In one or more embodiments, the image contrast evaluation system 110 may be accessed, for example, as a standalone application or by means of a plug-in, an extension and/or an add-on to a web browser, or by means of another software component that adds one or more features to a computer program. A browser extension, for example, expands the functionality of a web browser by installing specific toolbars, adding buttons or links, or providing other useful functions. When text is encountered by a user over a background of a display screen, the user may choose to evaluate the contrast by right-clicking, for example, on the text to activate the application from a list of options using a menu or by selecting the application plug-in in the browser. Once the application is active, the user may select the portion of the screen to be evaluated.

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The image database 108 is configured to store and record various information associated with images, such as images, image metadata and image contrast ratio information, which is used by the image contrast evaluation system 110 to evaluate contrast between textual portions and background portions of an image. The image database 108 in some embodiments is implemented using one or more storage systems or devices associated with the image contrast evaluation system 110. In some embodiments, one or more of the storage systems utilized to implement the image database 108 comprise a scale-out all-flash content addressable storage array or other type of storage array.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the image contrast evaluation system 110, as well as to support communication between the image contrast evaluation system 110 and other related systems and devices not explicitly shown.

The client devices 102 are configured to access or otherwise utilize the IT infrastructure 105. In some embodiments, the client devices 102 are assumed to be associated with users that execute one or more software applications. In other embodiments, the client devices 102 are assumed to be associated with system administrators, IT managers or other authorized personnel responsible for managing the IT assets 106 of the IT infrastructure 105 (e.g., where such management may include evaluation of contrast between textual portions and background portions of images). For example, a given one of the client devices 102 may be operated by a user to access a graphical user interface (GUI) provided by the image contrast evaluation system 110 to manage contrast ratio evaluation of one or more images. The image contrast evaluation system 110 may be provided as a cloud service that is accessible by the given client device 102 to allow the user thereof to evaluate a contrast ratio of one or more images. In some embodiments, the IT assets 106 of the IT infrastructure 105 are owned or operated by the same enterprise that operates the image contrast evaluation system 110 (e.g., where an enterprise such as a business provides support for the assets it operates). In other embodiments, the IT assets 106 of the IT infrastructure 105 may be owned or operated by one or more enterprises different than the enterprise which operates the image contrast evaluation system 110 (e.g., a first enterprise provides support for contrast ratio evaluation of images that are owned by multiple different customers, business, etc.). Various other examples are possible.

In other embodiments, the image contrast evaluation system 110 may provide support for contrast ratio evaluation of images associated with the client devices 102, instead of or in addition to providing support for the IT assets 106 of the IT infrastructure 105. For example, the image contrast evaluation system 110 may be operated by a hardware vendor that manufactures and sells computing devices (e.g., desktops, laptops, tablets, smartphones, etc.), and the client devices 102 represent computing devices sold by that hardware vendor. The image contrast evaluation system 110 may also or alternatively be operated by a software vendor that produces and sells software (e.g., applications) that runs on the client devices 102. The image contrast evaluation system 110, however, is not required to be operated by any single hardware or software vendor. Instead, the image contrast evaluation system 110 may be offered as a service to provide support for computing devices or software that are sold by any number of hardware or software vendors. The client devices 102 may subscribe to the image contrast evaluation system 110, so as to provide support for contrast ratio evaluation of images associated with the client devices 102 or software running thereon. Various other examples are possible.

In some embodiments, the client devices 102 may implement host agents that are configured for automated transmission of information regarding a state of the client devices 102 (e.g., such as in the form of images periodically provided to the image database 108 and/or the image contrast evaluation system 110). Such host agents may also or alternatively be configured to automatically receive from the image contrast evaluation system 110 commands to execute remote actions (e.g., to run various contrast ratio evaluation steps on the client devices 102 and/or the IT assets 106 of the IT infrastructure 105). Host agents may similarly be deployed on the IT assets 106 of the IT infrastructure 105.

It should be noted that a "host agent" as this term is generally used herein may comprise an automated entity, such as a software entity running on a processing device. Accordingly, a host agent need not be a human entity.

The image contrast evaluation system 110 in the FIG. 1 embodiment is assumed to be implemented using at least one processing device. Each such processing device generally comprises at least one processor and an associated memory, and implements one or more functional modules or logic for controlling certain features of the image contrast evaluation system 110. In the FIG. 1 embodiment, the image contrast evaluation system 110 comprises an image preprocessing module 112, an OCR module 114, a font characteristics evaluation module 116 and a contrast ratio evaluation module 118. The image preprocessing module 112 is configured to obtain one or more images and to transform the obtained images into at least one designated format suitable for use by the OCR module 114 and/or the font characteristics evaluation module 116. For example, the transforming of the obtained images may include adjusting a size of a textual portion in the obtained images, converting the obtained images into a bi-level image and/or reducing noise in the obtained images. The OCR module 114 is configured to recognize one or more text portions in obtained images. The font characteristics evaluation module 116 is configured to process the text portions identified by the OCR module 114 to determine a font size, a font weight and/or a font type of the text portions. The contrast ratio evaluation module 118, in some embodiments, determines a contrast ratio threshold applicable to identified text and to compare measured contrast ratios to the corresponding determined contrast ratio thresholds.

It is to be appreciated that the particular arrangement of the client devices 102, the IT infrastructure 105 and the image contrast evaluation system 110 illustrated in the FIG. 1 embodiment is presented by way of example only, and alternative arrangements can be used in other embodiments. As discussed above, for example, the image contrast evaluation system 110 (or portions of components thereof, such as one or more of the image preprocessing module 112, the OCR module 114, the font characteristics evaluation module 116 and the contrast ratio evaluation module 118) may in some embodiments be implemented internal to one or more of the client devices 102 and/or the IT infrastructure 105.

At least portions of the image preprocessing module 112, the OCR module 114, the font characteristics evaluation module 116 and the contrast ratio evaluation module 118 may be implemented at least in part in the form of software that is stored in memory and executed by a processor.

The image contrast evaluation system 110 and other portions of the information processing system 100, as will be described in further detail below, may be part of cloud infrastructure.

The image contrast evaluation system 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the image database 108 and the image contrast evaluation system 110 or components thereof (e.g., the image preprocessing module 112, the OCR module 114, the font characteristics evaluation module 116 and the contrast ratio evaluation module 118) may be implemented on respective distinct processing platforms, although numerous other arrangements are possible. For example, in some embodiments at least portions of the image contrast evaluation system 110 and one or more of the client devices 102, the IT infrastructure 105 and/or the image database 108 are implemented on the same processing platform. A given client device (e.g., client device 102-1) can therefore be implemented at least in part within at least one processing platform that implements at least a portion of the image contrast evaluation system 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the image database 108 and the image contrast evaluation system 110, or portions or components thereof, to reside in different data centers. Numerous other distributed implementations are possible. The image contrast evaluation system 110 can also be implemented in a distributed manner across multiple data centers.

Additional examples of processing platforms utilized to implement the image contrast evaluation system 110 and other components of the information processing system 100 in illustrative embodiments will be described in more detail below in conjunction with FIGS. 7 and 8.

It is to be appreciated that these and other features of illustrative embodiments are presented by way of example only and should not be construed as limiting in any way.

It is to be understood that the particular set of elements shown in FIG. 1 for evaluation of contrast between textual portions and background portions of an image is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only and should not be construed as limiting in any way.

Figure 2A:
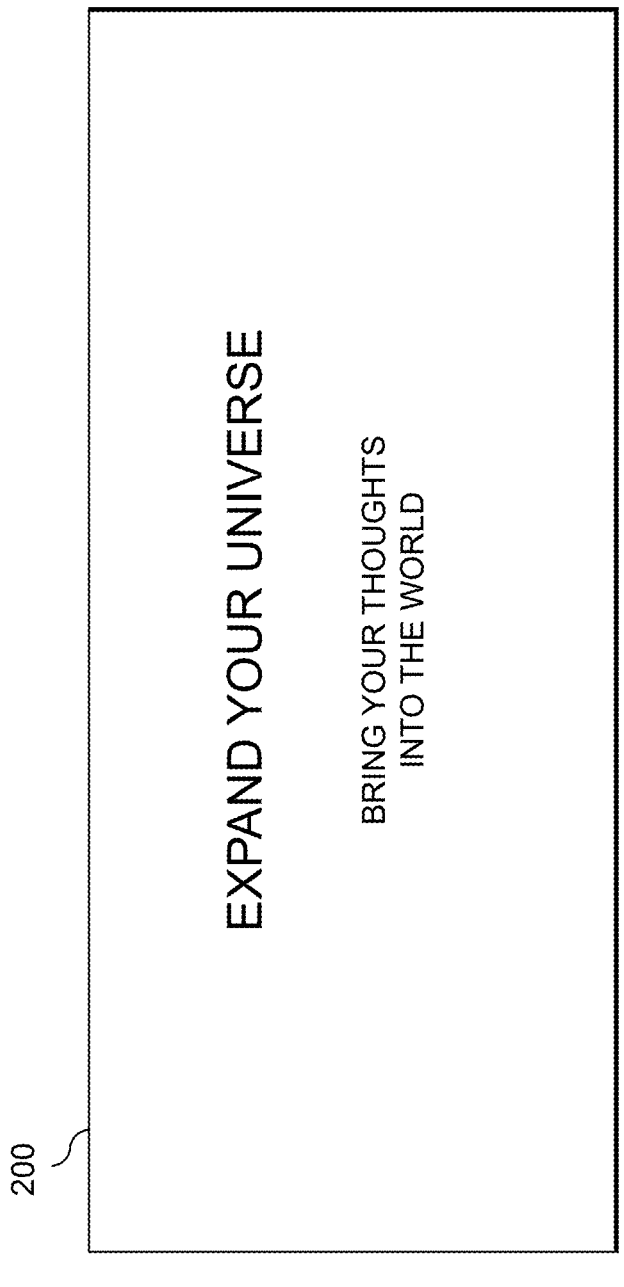
FIGS. 2A through 2C illustrate a number of exemplary images comprising text to be evaluated using the information processing system of FIG. 1 in illustrative embodiments.

FIG. 2A illustrates an exemplary image 200 comprising text to be evaluated using the information processing system of FIG. 1 in an illustrative embodiment. In the example of FIG. 2A, the image 200 comprises two portions of text. A first portion of text comprises the phrase "expand your universe," while the second portion of text comprises the phrase "bring your thoughts into the world." The two portions of text in the example of FIG. 2A have different font sizes, and may therefore potentially have different applicable contrast ratio thresholds. For example, as noted above, WCAG version 2.1 specifies that text below 24 pixels vertically for regular text or below 18.5 pixels vertically for bold text has a higher contrast requirement (e.g., a 4.5:1 contrast ratio) than text above such thresholds (e.g., a 3:1 contrast ratio).

The disclosed contrast ratio evaluation techniques identify pixels associated with where the edge of a text portion meets a background image portion (e.g., a white background in the example of FIG. 2A) and determine a respective luminance for the text portion pixel and the adjacent background portion pixel in order to compute the contrast ratio. In some embodiments, artificial intelligence (AI) techniques are employed to automatically locate text portions in an image, such as the image 200, and to ascertain the color of each text portion and adjacent background portions.

Figure 2B:
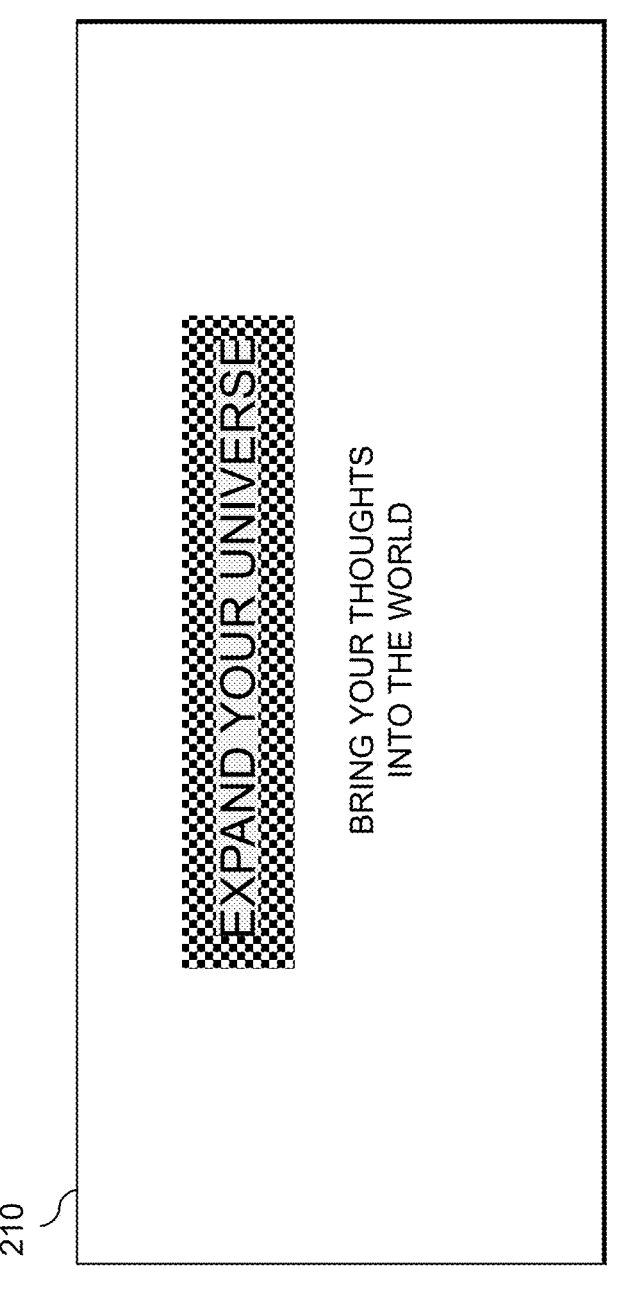

FIG. 2B illustrates an exemplary image 210 comprising text to be evaluated using the information processing system of FIG. 1 in an illustrative embodiment. In the example of FIG. 2B, the image 210 comprises two portions of text. A first portion of text comprises the phrase "expand your universe," while the second portion of text comprises the phrase "bring your thoughts into the world," in a similar manner as the text portions of FIG. 2A. The two portions of text in the example of FIG. 2B have different font sizes and may therefore potentially have different applicable contrast ratio thresholds, in a similar manner as the exemplary image 200 of FIG. 2A. In the example of FIG. 2B, however, the first portion of text comprising the phrase "expand your universe" is against a more complex background image portion, such as a hash pattern (e.g., the text is positioned on top of the complex background image portion and the complex background image portion may continue beneath the text). Thus, the disclosed contrast ratio evaluation techniques identify pixels associated with where the edge of a text portion meets a more complex background image portion (e.g., a hash pattern background in the example of FIG. 2B) and determine a respective luminance for the text portion pixel and each adjacent background portion pixel in order to separately compute the contrast ratio.

Figure 2C:
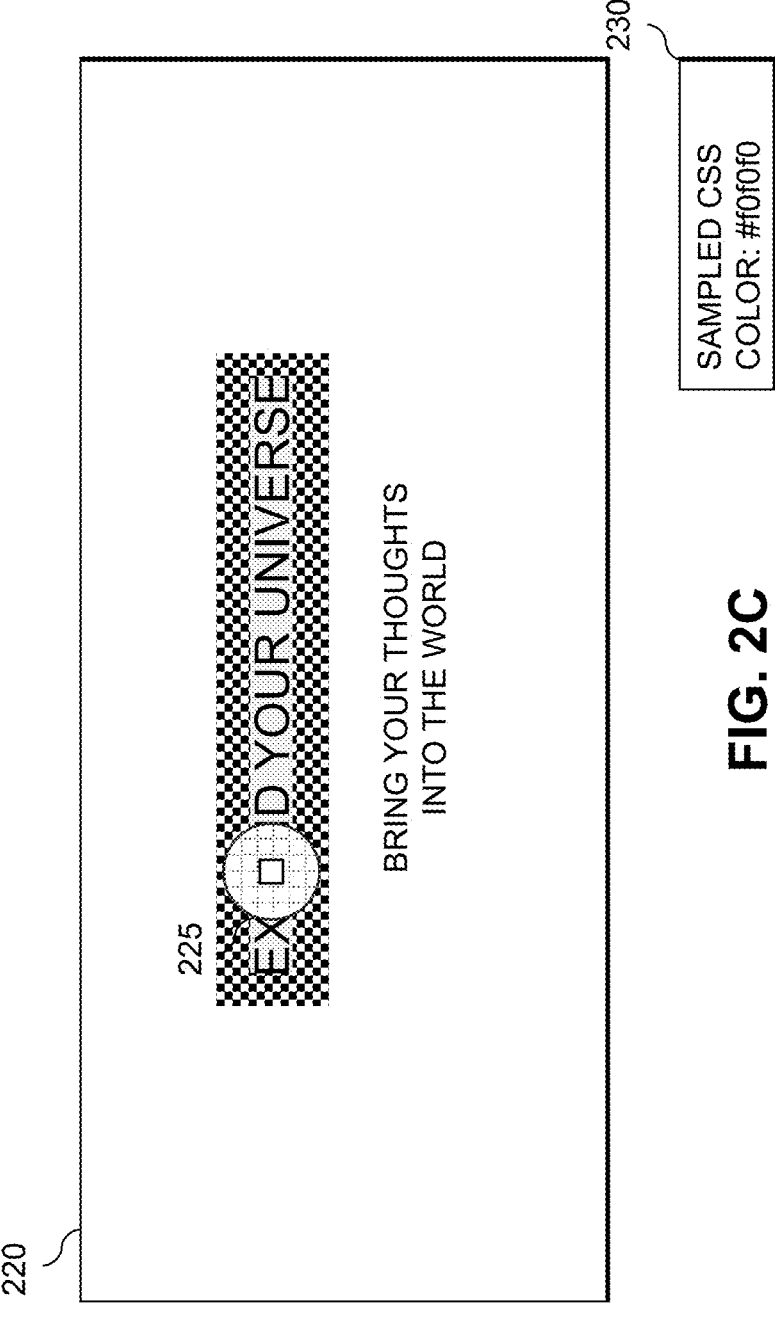

FIG. 2C illustrates an exemplary image 220 comprising text to be evaluated using the information processing system of FIG. 1 in an illustrative embodiment. In the example of FIG. 2C, the exemplary image 220 is substantially the same image as the image 210 of FIG. 2B. The example user interface of FIG. 2C provides a tool 225 that allows a user to evaluate (e.g., spot check) a selected portion of the image 220 (such as a selected pixel or pixel region associated with the text foreground and/or a background portion of the image). For example, if a given user knows that a particular text portion having a particular font color, such as white, is adjacent to a background portion, the given user may override an automatically measured color value (e.g., a sampled CSS (Cascading Style Sheets)) of the particular text portion by giving an exact color value for better accuracy (e.g., to fine tune the results). For example, if the given user knows that the text portion is intended to be white, but the automatically measured color value in one or more portions of the image is an off-white color, then the given user may override the automatically measured color value by specifying a white color for the text portion, for example, in a hexadecimal color format.

As noted above, AI techniques may be employed to automatically locate text portions in an image, such as the image 220, and to ascertain the color of each text portion and adjacent background portions. The tool 225 provides a mechanism for user adjustment of such determined color values, by inputting a color value directly. The color may be specified by a user, for example, in a pop-up window 230 adjacent to, or on top of, the image 220 using a hexadecimal color format in the form of #RRGGBB, where RR indicates hexadecimal integers specifying the red components of the color, GG indicates hexadecimal integers specifying the green components of the color and BB indicates hexadecimal integers specifying the blue components of the color. It is noted that HTML (hypertext markup language) documents, for example, reproduce images using such hexadecimal color formats for the background and text portions of an image and such hexadecimal color values may be obtained from a given HTML document in some embodiments for improved color accuracy.

As discussed further below in conjunction with FIG. 5, machine learning-based techniques may be employed in some embodiments to predict one or more font characteristics (e.g., font size and font weight, such as distinguishing between a font weight associated with a bold font and a font weight associated with a regular font) associated with one or more text portions of an image. In this manner, the appropriate contrast ratio threshold may be determined using such font characteristics, for example, in accordance with WCAG version 2.1 standard or another accessibility standard or guideline.

FIG. 3 is a process diagram illustrating an exemplary implementation of a process 300 for evaluation of contrast between textual portions and background portions of an image in an illustrative embodiment. In the example of FIG. 3, the process 300 initially applies an image to a preprocessor, such as image preprocessing module 112 of FIG. 1. In some embodiments, the preprocessing may comprise transforming applied images into a designated format that is suitable for use by one or more subsequent steps of the process 300, performed, for example, by the OCR module 114 and/or the font characteristics evaluation module 116. For example, the preprocessing may include adjusting a size of a textual portion in the applied image, converting the applied image into a bi-level image and/or reducing noise in the applied image.

The process 300 may then extract text and text bounding boxes from the preprocessed image, for example, using the OCR module 114 of FIG. 1. One or more font characteristics (e.g., a font size, a font weight and/or a font type) of the text identified in the preprocessed image are then evaluated, for example, using the font characteristics evaluation module 116 of FIG. 1, as discussed further below in conjunction with FIG. 5. In some embodiments, a font type of the identified text may be determined using a font finder or a font identifier. A contrast ratio threshold is then determined based on the evaluated font characteristics (such as font size and font weight).

A luminance value may be obtained for the text foreground and background portions of the image adjacent to the extracted text. The contrast ratio may be calculated, for example, using the contrast ratio evaluation module 118 of FIG. 1, based at least in part on the obtained luminance values for the text foreground and background portions. For example, the contrast ratio may be calculated in some embodiments as a ratio of the obtained luminance values for the text foreground and background portions. The calculated contrast ratio is then compared to the determined contrast ratio threshold. One or more automated actions may be performed based on a result of the comparison. For example, one or more notifications may be generated in response to a failing contrast ratio, an image may be presented indicating failing portions of the image that have a failing contrast ratio (e.g., to allow the user to see an extent of the failing portions and thereby permit an investigation of the failures), and/or one or more recommendations may be provided to improve the contrast ratio (e.g., moving a failing text portion to a different portion of an image and/or recommending a different color that would provide a passing contrast ratio).

Figure 4:
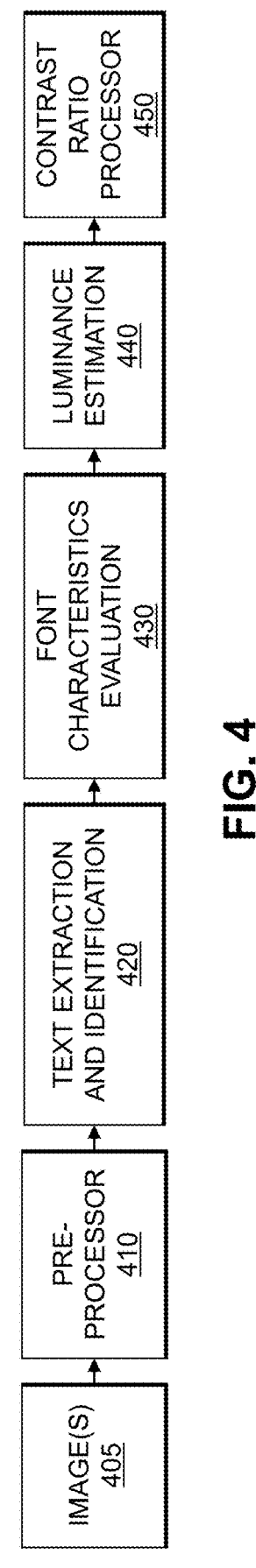
FIG. 4 is a block diagram illustrating an evaluation of contrast between textual portions and background portions of an image in an illustrative embodiment.

FIG. 4 is a block diagram illustrating an evaluation of contrast between textual portions and background portions of an image in an illustrative embodiment. In the example of FIG. 4, one or more images 405 are applied to a preprocessor 410 that may transform the images 405 into a format suitable for use by one or more subsequent stages of FIG. 4. The transformations may include adjusting a text size in an image 405, converting an applied image 405 into a bi-level image and/or reducing noise in the applied image 405.

The preprocessed image is then processed in some embodiments by a text extraction and identification stage 420 that extracts text from the applied image 405 and may identify the extracted text, for example, using text bounding boxes. The text extraction and identification stage 420 may employ an OCR engine (or another image-based text recognition technique) that returns the coordinates of the text portions of the image 405, which can be used in some embodiments to calculate the height of the text in the image. One or more aspects of the disclosure recognize that calculating the font size in this manner may have inconsistent accuracy, since the calculation depends on the image resolution among other factors. In at least some embodiments, an OCR engine within the text extraction and identification stage 420 detects text, for example, using an AI tool such as Tesseract or OpenCV (e.g., an open-source computer vision library).

Thus, font characteristics (e.g., a font size, a font weight and/or a font type) of the text identified in the image 405 may be evaluated in some embodiments by a font characteristics evaluation stage 430, as discussed further below in conjunction with FIG. 5. The font characteristics evaluation stage 430 may employ machine learning techniques to predict font characteristics in images, following a training of a machine learning model using labeled training data. In some embodiments, a font type of the identified text may be determined using a font finder or a font identifier. A contrast ratio threshold may be determined based on the evaluated font characteristics (such as font size and/or font weight), in the manner described above.

A luminance estimation stage 440 obtains luminance values for the text foreground and adjacent background portions of the image 405. One or more image processing libraries in OpenCV, for example, can extract the color of the text foreground (e.g., in a hexadecimal color format in the form of #RRGGBB) by taking a sample of pixels inside a bounding box and then extracting the background color by taking a sample of pixels just outside the bounding box or within a certain margin of the bounding box.

A contrast ratio processor 450 may calculate the contrast ratio based on the obtained luminance values for the text foreground and adjacent background portions. With the hexadecimal color values of the text foreground and the adjacent background portions in the form of #RRGGBB, the contrast ratio processor 450 may employ a programmed function to compute the contrast ratio between them, for example, using an advanced perceptual contrast algorithm (APCA) to calculate the contrast ratios. In one or more embodiments, the contrast ratio may be calculated as a ratio of the obtained luminance values for the text foreground and background portions. The calculated contrast ratio may then be compared by the contrast ratio processor 450 to the determined contrast ratio threshold. One or more automated actions may optionally be performed based on a result of the comparison. For example, one or more notifications may be generated in response to a failing contrast ratio, an image may be presented indicating failing portions of the image that have a failing contrast ratio (e.g., to allow the user to see an extent of the failing portions), and/or one or more recommendations may be provided to improve the contrast ratio.

Figure 5:
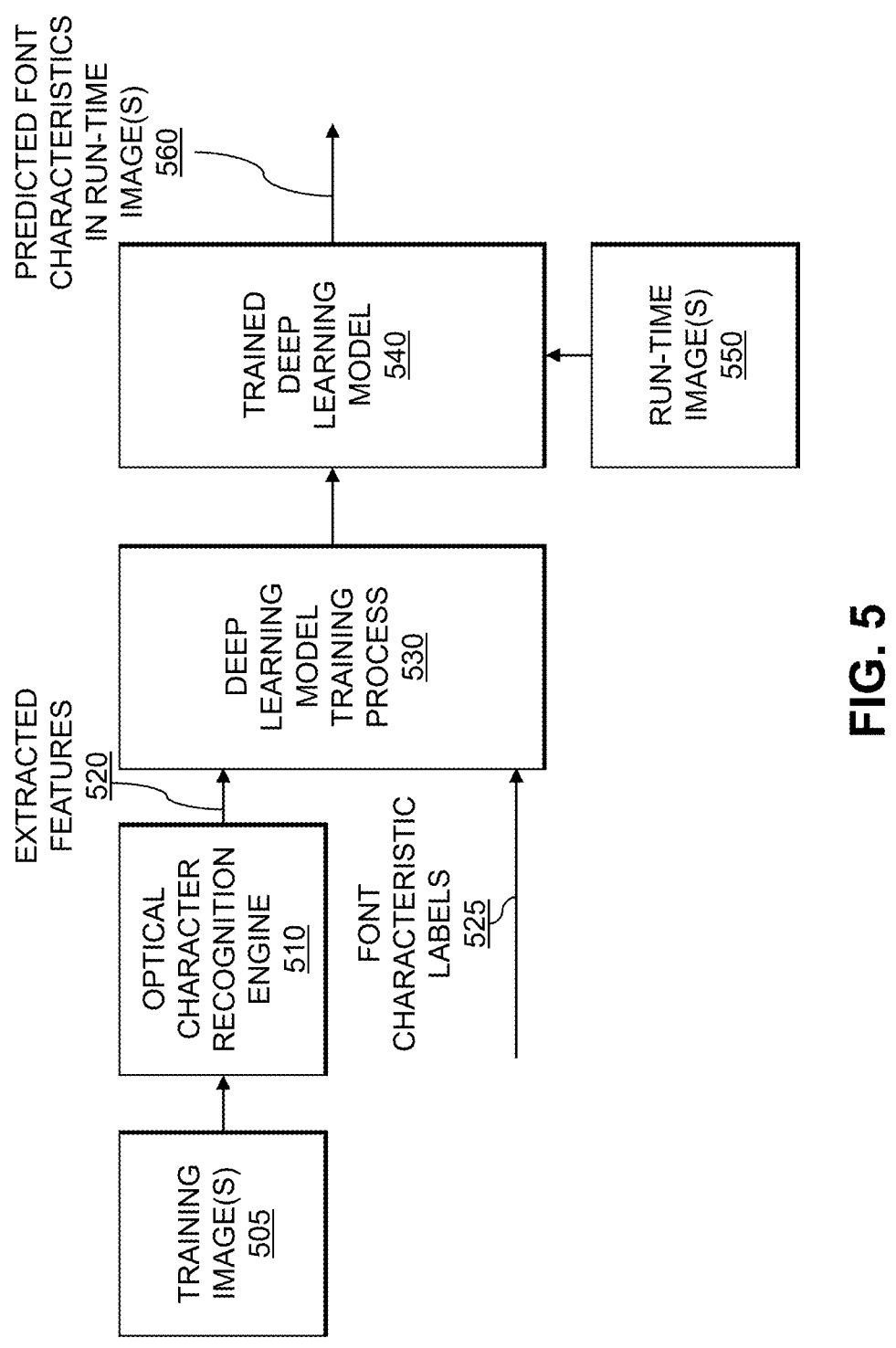
FIG. 5 illustrates an exemplary deep learning model in a training mode and a prediction mode, in an illustrative embodiment.

FIG. 5 illustrates an exemplary deep learning model 540 in a training mode and a prediction mode, in an illustrative embodiment. As noted above, AI, machine learning and/or neural networks are employed in some embodiments to predict one or more font characteristics (e.g., a font size and a font weight, such as distinguishing between a font weight associated with a bold font and a font weight associated with a regular font) associated with each text portion of an image. The predicted font characteristics allow an appropriate contrast ratio threshold to be determined using such font characteristics, for example, in accordance with WCAG version 2.1 or another accessibility standard or guideline.

In the example of FIG. 5, during a training mode, one or more training images 505 are applied to an OCR engine 510 that extracts one or more features 520 from the training images 505 (or portions thereof). For example, the features 520 may characterize textual portions as being informative or decorative. A given feature 520 may indicate, for example, whether the corresponding text appears on a product (e.g., as part of a logo), or as part of a landscape scene (e.g., on a road sign). Such decorative text does not need to be evaluated as text, in some embodiments, by the disclosed contrast ratio evaluation techniques.

For each training image (or one or more portions thereof), the features 520 extracted from the respective training image, as well as one or more font characteristic labels 525, are applied to a deep learning model training process 530. The font characteristic labels 525 may identify a font size, a font weight and/or a font type of the text portions of the respective training image. The deep learning model training process 530 processes the features 520 and the font characteristic labels 525 using a supervised learning process to train a deep learning model, where the supervised learning process learns to predict the font characteristics of previously unseen images using the features 520 and the font characteristic labels 525. The deep learning model training process 530 generates a trained deep learning model 540.

During a prediction mode, the deep learning model training process 530 processes one or more run-time images 550 and generates predicted font characteristics 560 for each run-time image 550. In some embodiments, the trained deep learning model 540 can be retrained on a periodic basis (e.g., daily, weekly, etc.) and/or in response to one or more criteria being satisfied (e.g., a threshold number of images being processed, a threshold number of images failing a contrast ratio evaluation and/or a threshold number of user overrides (e.g., negative feedback) of predicted font characteristics). Accordingly, the trained deep learning model 540 can be continuously improved over time.

FIG. 6 is a flow diagram illustrating an exemplary implementation of a process for evaluation of contrast between textual portions and background portions of an image, according to an embodiment. In the example of FIG. 6, at least one textual portion is identified in step 604 in an image. The term "image," as used herein, shall be broadly construed to encompass any digital representation of visual content, such as a two-dimensional digital representation of the visual content (e.g., web content and/or digital media). The image may be transformed into at least one designated format prior to identifying the at least one textual portion in the image. For example, the transformation may comprise adjusting a size of the at least one textual portion of the image, converting the image into a bi-level image and/or reducing noise in the image. The at least one textual portion may be identified in the image, for example, by applying the image to at least one processor-based OCR engine. A font size and/or a font weight of the at least one textual portion may be determined by evaluating a bounding box, associated with the at least one textual portion, generated by the OCR engine.

At least one contrast ratio threshold applicable to the at least one textual portion is automatically determined in step 606 based at least in part on one or more font characteristics (e.g., a font size, a font weight and/or a font type) of the at least one textual portion. The term "contrast ratio threshold," as used herein, shall be broadly construed to encompass any contrast ratio requirement for a digital image (or portion thereof) specified by an applicable standard, law, regulation, design guide, policy or another guideline. The at least one contrast ratio threshold applicable to the at least one textual portion may be determined in some embodiments by applying the image to a trained deep learning model (such as the trained deep learning model 540 of FIG. 5) that predicts a font size and/or a font weight of the at least one textual portion and wherein the at least one contrast ratio threshold applicable to the at least one textual portion is determined using the predicted font size and/or the predicted font weight.

A contrast ratio of the at least one textual portion is determined in step 608 based at least in part on a luminance of a background portion of the image that is adjacent to the at least one textual portion. The contrast ratio may be determined in step 608, for example, by evaluating a luminance of the at least one textual portion relative to the luminance of the background portion of the image that is adjacent to the at least one textual portion.

In step 610, the contrast ratio and the at least one contrast ratio threshold are compared and one or more automated actions are initiated in step 612 based on a result of the comparison. For example, the one or more automated actions may comprise: generating at least one notification; providing a visual indication of one or more portions of the image that do not satisfy the at least one contrast ratio threshold; providing one or more recommendations for addressing one or more portions of the image that do not satisfy the at least one contrast ratio threshold and/or automatically adjusting one or more characteristics of the image.

13                                                                14

The recommendations and/or automatic adjustments may comprise, for example, moving a failing text portion to a different portion of an image and/or employing a different color for the foreground and/or the background that would provide a satisfactory contrast ratio. In this manner, the disclosed contrast ratio evaluation techniques automatically detect contrast ratio issues in images and automatically adjust one or more characteristics of such images to mitigate a detected contrast ratio issue.

In some embodiments, a contrast ratio of one or more icons in the image may also be evaluated. For example, icons in an image may be identified using a keyword search in an image and the contrast ratio of such identified icons may be evaluated and compared to an applicable contrast ratio threshold. In some embodiments, the evaluation may consider whether a given icon is meaningful. For example, icons that provide an additional visual backup to the adjacent wording may not have a particular meaning and may not be required to adhere to a given contrast ratio threshold.

The particular processing operations and other network functionality described in conjunction with FIGS. 3 through 6, for example, are presented by way of illustrative example only, and should not be construed as limiting the scope of the disclosure in any way. Alternative embodiments can use other types of processing operations to provide functionality for evaluation of contrast between textual portions and background portions of an image. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Among other benefits, the disclosed contrast ratio evaluation techniques allow developers and designers, for example, working on print media, web content or digital media, to identify and address accessibility issues in images that comprise text. By ensuring that visual content meets accessibility standards, the user experience is improved for a wide range of users, including those with visual impairments. In addition, the disclosed contrast ratio evaluation techniques reduce the level of risk, and increase the level of inclusion, for enterprises and other providers of visual content by ensuring that all text is accessible to users with disabilities.

Illustrative embodiments of processing platforms utilized to implement functionality for evaluation of contrast between textual portions and background portions of an image will now be described in greater detail with reference to FIGS. 7 and 8. Although described in the context of information processing system 100, these platforms may also be used to implement at least portions of other information processing systems in other embodiments.

Figure 7:
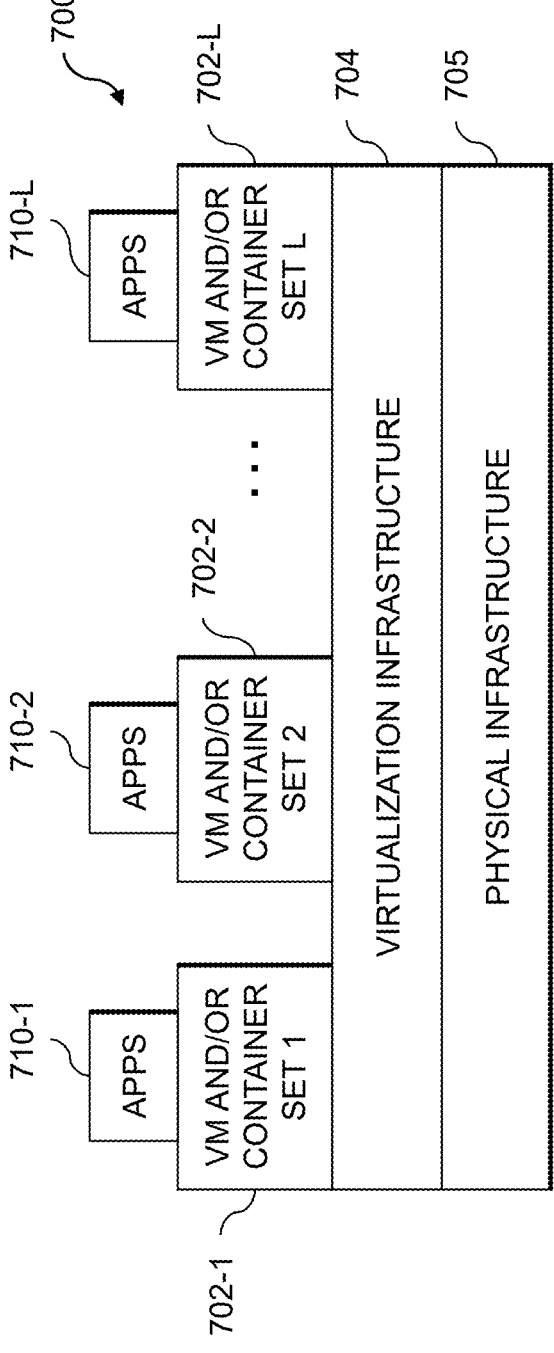
FIGS. 7 and 8 show examples of processing platforms that may be utilized to implement at least a portion of an information processing system in illustrative embodiments.
Figure 8:
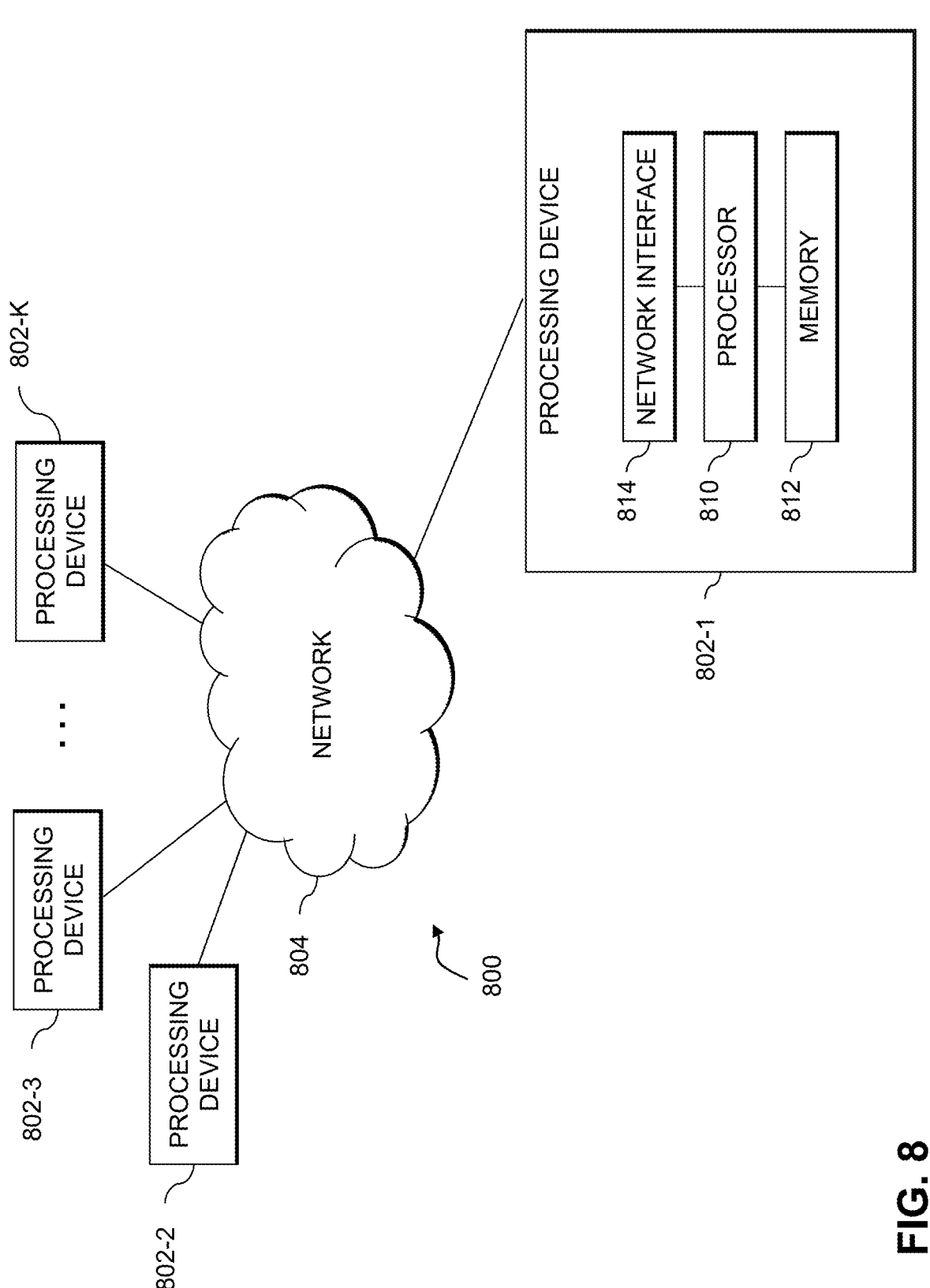

FIG. 7 shows an example processing platform comprising cloud infrastructure 700. The cloud infrastructure 700 comprises a combination of physical and virtual processing resources that may be utilized to implement at least a portion of the information processing system 100 in FIG. 1. The cloud infrastructure 700 comprises multiple virtual machines (VMs) and/or container sets 702-1, 702-2 . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of information processing system 100 and includes a plurality of processing devices, denoted 802-1, 802-2, 802-3 . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for evaluation of contrast between textual portions and background portions of an image as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
identifying at least one textual portion in an image;

automatically determining at least one contrast ratio threshold applicable to the at least one textual portion based at least in part on one or more font characteristics of the at least one textual portion, wherein the one or more font characteristics of the at least one textual portion comprise one or more of a font size, a font weight and a font type;

determining a contrast ratio of the at least one textual portion based at least in part on a luminance of a background portion of the image that is adjacent to the at least one textual portion;

comparing the contrast ratio and the at least one contrast ratio threshold; and initiating one or more automated actions based at least in part on a result of the comparison;

wherein the method is performed by at least one processing device comprising a processor coupled to a memory.

2. The method of claim 1, further comprising transforming the image into at least one designated format prior to the identifying the at least one textual portion in the image.

3. The method of claim 2, wherein the transforming the image comprises one or more of adjusting a size of at least one textual portion of the image, converting the image into a bi-level image and reducing noise in the image.

4. The method of claim 1, wherein the identifying the at least one textual portion in the image comprises applying the image to at least one processor-based optical character recognition engine.

5. The method of claim 4, wherein one or more of the font size and the font weight of the at least one textual portion is determined by evaluating a bounding box, associated with the at least one textual portion, generated by the optical character recognition engine.

6. The method of claim 1, wherein the contrast ratio is determined by evaluating a luminance of the at least one textual portion relative to the luminance of the background portion of the image that is adjacent to the at least one textual portion.

7. The method of claim 1, wherein the one or more automated actions comprise one or more of: generating at least one notification; providing a visual indication of one or more portions of the image that do not satisfy the at least one contrast ratio threshold; providing one or more recommendations for addressing one or more portions of the image that do not satisfy the at least one contrast ratio threshold and automatically adjusting one or more characteristics of the image.

8. The method of claim 1, wherein the at least one contrast ratio threshold applicable to the at least one textual portion is determined by applying the image to a trained deep learning model that predicts one or more of the font size and the font weight of the at least one textual portion and wherein the at least one contrast ratio threshold applicable to the at least one textual portion is determined using the one or more of the predicted font size and the predicted font weight.

9. The method of claim 1, further comprising evaluating a contrast ratio of one or more icons in the image.

10. An apparatus comprising:
at least one processing device comprising a processor coupled to a memory;

the at least one processing device being configured to implement the following steps:

identifying at least one textual portion in an image;

automatically determining at least one contrast ratio threshold applicable to the at least one textual portion based at least in part on one or more font characteristics of the at least one textual portion, wherein the one or more font characteristics of the at least one textual portion comprise one or more of a font size, a font weight and a font type;

determining a contrast ratio of the at least one textual portion based at least in part on a luminance of a background portion of the image that is adjacent to the at least one textual portion;

comparing the contrast ratio and the at least one contrast ratio threshold; and initiating one or more automated actions based at least in part on a result of the comparison.

11. The apparatus of claim 10, further comprising one or more of adjusting a size of the at least one textual portion of the image, converting the image into a bi-level image and reducing noise in the image.

12. The apparatus of claim 10, wherein the identifying the at least one textual portion in the image comprises applying the image to at least one processor-based optical character recognition engine that determines one or more of the font size and the font weight of the at least one textual portion.

13. The apparatus of claim 10, wherein the one or more automated actions comprise one or more of: generating at least one notification; providing a visual indication of one or more portions of the image that do not satisfy the at least one contrast ratio threshold; providing one or more recommendations for addressing one or more portions of the image that do not satisfy the at least one contrast ratio threshold and automatically adjusting one or more characteristics of the image.

14. The apparatus of claim 10, wherein the at least one contrast ratio threshold applicable to the at least one textual portion is determined by applying the image to a trained deep learning model that predicts one or more of the font size and the font weight of the at least one textual portion and wherein the at least one contrast ratio threshold applicable to the at least one textual portion is determined using the one or more of the predicted font size and the predicted font weight.

15. A non-transitory processor-readable storage medium having stored therein program code of one or more software programs, wherein the program code when executed by at least one processing device causes the at least one processing device to perform the following steps:

identifying at least one textual portion in an image;

automatically determining at least one contrast ratio threshold applicable to the at least one textual portion based at least in part on one or more font characteristics of the at least one textual portion, wherein the one or more font characteristics of the at least one textual portion comprise one or more of a font size, a font weight and a font type;

determining a contrast ratio of the at least one textual portion based at least in part on a luminance of a background portion of the image that is adjacent to the at least one textual portion;

comparing the contrast ratio and the at least one contrast ratio threshold; and initiating one or more automated actions based at least in part on a result of the comparison.

16. The non-transitory processor-readable storage medium of claim 15, further comprising one or more of adjusting a size of the at least one textual portion of the image, converting the image into a bi-level image and reducing noise in the image.

17. The non-transitory processor-readable storage medium of claim 15, wherein the identifying the at least one textual portion in the image comprises applying the image to at least one processor-based optical character recognition engine that determines one or more of the font size and the font weight of the at least one textual portion.

18. The non-transitory processor-readable storage medium of claim 15, wherein the one or more automated actions comprise one or more of: generating at least one notification; providing a visual indication of one or more portions of the image that do not satisfy the at least one contrast ratio threshold; providing one or more recommendations for addressing one or more portions of the image that do not satisfy the at least one contrast ratio threshold and automatically adjusting one or more characteristics of the image.

19. The non-transitory processor-readable storage medium of claim 15, wherein the at least one contrast ratio threshold applicable to the at least one textual portion is determined by applying the image to a trained deep learning model that predicts one or more of the font size and the font weight of the at least one textual portion and wherein the at least one contrast ratio threshold applicable to the at least one textual portion is determined using the one or more of the predicted font size and the predicted font weight.

20. The non-transitory processor-readable storage medium of claim 15, wherein the contrast ratio is determined by evaluating a luminance of the at least one textual portion relative to the luminance of the background portion of the image that is adjacent to the at least one textual portion.

* * * * *